United States Patent

[11] 3,566,017

[72] Inventor Albert Macovski
Palo Alto, Calif.
[21] Appl. No. 804,746
[22] Filed Mar. 6, 1969
[45] Patented Feb. 23, 1971
[73] Assignee RCA Corporation

[54] TELEVISION COLOR DIFFERENCE SIGNAL ENCODING SYSTEM
17 Claims, 5 Drawing Figs.

[52] U.S. Cl. .......... 178/5.4, 350/162, 350/169
[51] Int. Cl. .......... H04n 9/06
[50] Field of Search .......... 178/5.4 (STC), 5.4 (F), 5.4; 325/329, 330, 49

[56] References Cited

UNITED STATES PATENTS

| | | | |
|---|---|---|---|
| 2,733,291 | 1/1956 | Kell | 178/5.4(STC) |
| 3,378,633 | 4/1968 | Macovski | 178/5.4(SR) |
| 3,419,672 | 12/1968 | Macovski | 178/5.4(STC) |
| 3,470,310 | 9/1969 | Shashoua | 178/5.4 |

*Primary Examiner*—Richard Murray
*Assistant Examiner*—Richard P. Lange
*Attorney*—Eugene M. Whitacre

ABSTRACT: Each of the (B-Y) and (R-Y) sideband signals of two suppressed color carrier waves derived from a camera tube having a spatial color difference signal encoding filter is envelope detected and positive and negative polarities of the detected signal are developed, the proper polarity being selected to produce an unambiguous output signal by a switch controlled by a correct polarity indicating signal. The color carrier wave derived from the camera tube also is amplitude limited, doubled in frequency and applied to a controllable phase-frequency divider to produce an unambiguous reference wave of the suppressed color carrier wave frequency which is compared in phase with the signal modulated color carrier wave derived from the camera tube to produce the correct phase indicating signal which controls the switch. The frequency divider is controlled by a correcting signal produced by comparing the divider output with a phasing pulse generated during each horizontal scanning line. The phasing pulse is generated by projecting light from an external source through a narrow strip of filter material onto the camera tube area which is scanned during each horizontal raster line.

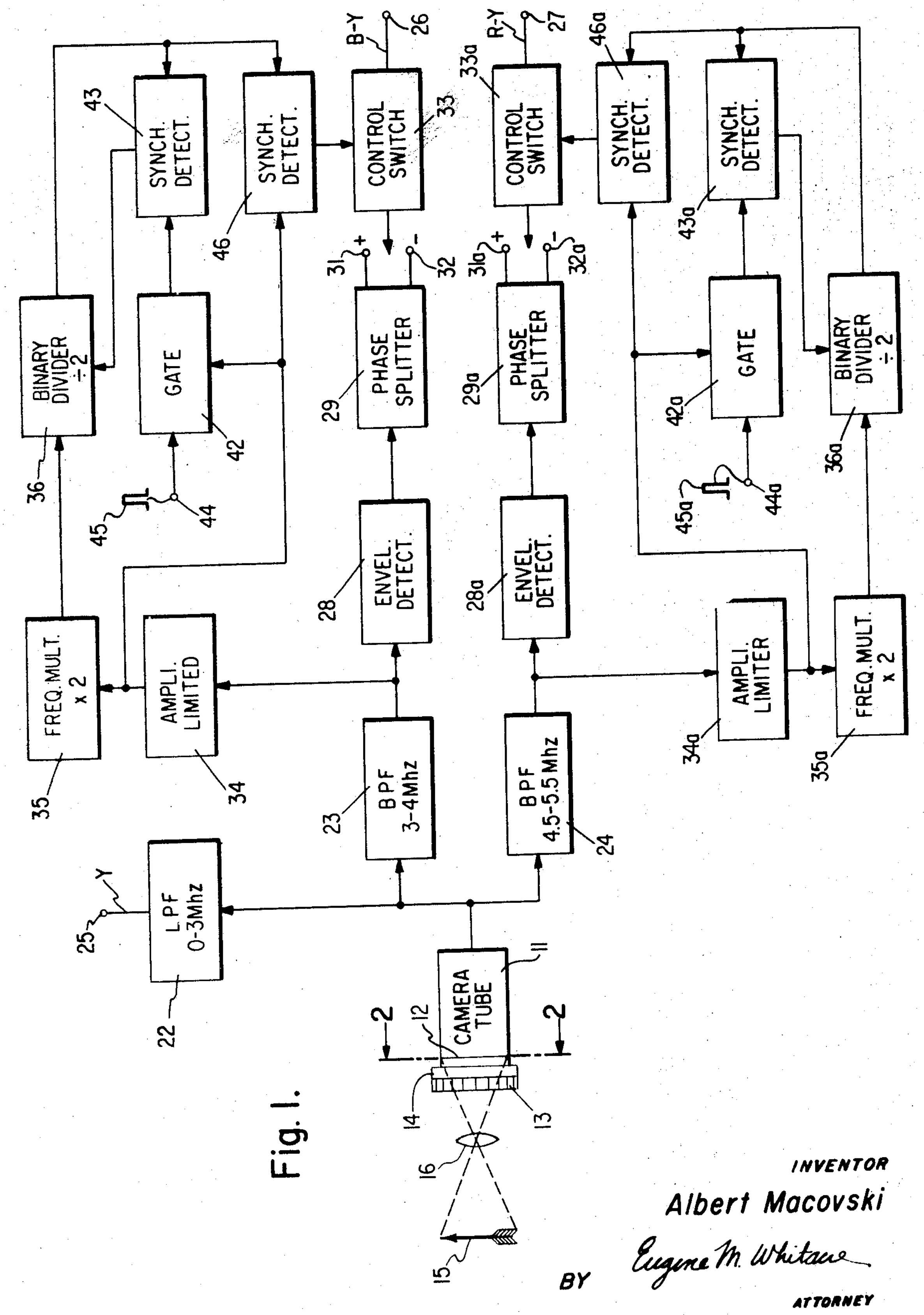
Fig. I.
INVENTOR
Albert Macovski
BY Eugene M. Whitacre
ATTORNEY

PATENTED FEB 23 1971

3,566,017

INVENTOR
Albert Macovski

BY Eugene M. Whitacre
ATTORNEY

TELEVISION COLOR DIFFERENCE SIGNAL ENCODING SYSTEM

BACKGROUND OF THE INVENTION

Color television systems employing a camera tube provided with spatial filter gratings for producing color television signals have previously been proposed as illustrated in U.S. Pat. No. 2,733,291 granted to R. D. Kell on Jan. 31, 1956 and in U.S. Pat. No. 3,378,633 granted to A. Macovski on Apr. 16, 1968. The color filter gratings used in such systems comprise, for example, strips of subtractive color selective filter material spaced apart by strips of transparent material. When light from a colored subject is projected onto the photosensitive electrode of a camera tube through the filter gratings, a color representative video signal is generated by scanning the electrode with an electron beam. The generated video signal is in the form of an amplitude modulated color carrier wave, the frequency of which depends upon the number of filter strips and the beam scanning rate, and the amplitude of which depends upon the intensity of the particular color light from the subject reaching the filter grating.

As taught in the Macovski patent, for example, the color signal encoding filter consists of two gratings, one of which has a first set of cyan filter strips capable of rejecting red light alternating with a second set of transparent strips; and the other of which has a first set of yellow filter strips capable of rejecting blue light alternating with a second set of transparent strips. The two gratings are mounted in such relation to one another and to the photosensitive electrode of the camera tube that the scansion by the electron beam of the respectively corresponding electrode areas produces in the camera tube output one carrier wave having a first frequency and modulated by red subject light representative signals and another carrier wave having a second frequency and modulated in amplitude by blue subject light representative signals. The average light projected onto the photosensitive camera tube electrode produces in the camera tube output a relatively low frequency band of luminance or so-called "Y" signals. In order to develop so-called "color difference" signals (such as R-Y and B-Y for example) for transmission and/or reproduction of a color picture from the luminance signal Y and the red and blue signals R and B, the respective red and blue signal modulated carrier waves derived from the camera tube are detected and the recovered red and blue signals R and B are matrixed in a presently well-known manner with the derived Y signal to produce the desired (R-Y) and (B-Y) color difference signals.

It has been found that color difference signals may be derived directly from the camera tube, thereby obviating the use of a matrixing network to produce such signals as in the systems such as represented by the Kell and Macovski patents referred to. This is accomplished by using material for the color selecting strips of the color signal encoding filter grating which passes all colors except the one desired for the color difference signal and by interspersing such color selective strips with strips of neutral density (grey) material in place of the previously used transparent material. The transmissivity of the grey and color selective strips of the gratings is equal for white light. By making one filter grating of alternate cyan and grey strips to produce a first frequency, a red color difference signal (R-Y) is generated as an amplitude modulation of a color carrier wave having such first frequency. A blue color difference signal (B-Y) is similarly generated as an amplitude modulation of a color carrier wave having a second frequency by means including a filter grating of alternate yellow and grey strips. Unlike the systems in which the alternating strips are transparent, the use of neutral density material results in the production of no carrier wave in response to neutral, or uncolored, areas of the subject. Hence, the color difference signals (R-Y) and (B-Y) are encoded as sidebands of two different suppressed carrier waves. The two color difference signals may be separately recovered by envelope detection of the two amplitude modulated suppressed carrier waves, but there is no way of determining, without additional information, whether the recovered signals represent the desired color difference signal or the inverse of it. In other words, there is a polarity ambiguity which must be resolved in order to make proper use of the recovered signals.

In a copending application Ser. No. 804,885 filed concurrently herewith, and entitled "Color Television Camera Encoding System" a color difference encoding system is described in which the reference signal to be used for demodulation of the carrier waves is derived from a neutral density grating disposed directly in the optical path of the scene to be encoded. This neutral density filter undesirably absorbs some scene light and some scene light must always be present to image the reference signal grating onto the photosensitive electrode of a camera pickup tube.

It, therefore, is an object of this invention to provide apparatus and a circuit system by which color difference signals may be generated and recovered from suppressed color carrier waves derived from a camera tube without polarity ambiguity.

In accordance with this invention, the envelope of the sidebands of a suppressed color carrier wave which are amplitude modulated by a color difference signal is detected by means which produce both positive and negative polarities of the color difference signal, the proper one of which is selected under the control of an indicating signal that is representative of the correct signal polarity. The indicating signal is developed by means employing a phasing pulse which is generated at the start of each horizontal line of the raster by which the colored subject is analyzed to produce the color difference signal modulated suppressed carrier wave. An unmodulated constant phase unambiguous reference wave is produced under the control of the phasing signal and is compared with the signal modulated carrier wave to develop the indicating signal. The unambiguous reference wave is produced by multiplying the frequency of the signal modulated suppressed carrier wave, preferably after amplitude limiting it to remove all amplitude modulation, by an even number factor (e.g., 2) and then dividing the multiplied frequency by the same even number factor in a controllable phase-frequency divider. The output of the frequency divider is compared in phase with the phasing pulse to develop a phase correcting signal representative of a phase disagreement resulting from the comparison. The phase correcting signal is applied to the frequency divider to reverse its phase, thereby making its output an unambiguous reference wave which is then compared in phase with the color difference signal modulated color carrier wave to develop the indicating signal.

In a presently preferred embodiment of the invention, the frequency divider is a binary counter and the two phase comparison means are synchronous detectors. Also in such preferred embodiment, the color difference signal modulated color carrier wave is produced by projecting light from the subject onto the photosensitive electrode of a camera tube through an encoding strip filter and the phasing pulse is produced by directing colored light from a source other than the subject onto a narrow strip located relative to the photosensitive camera tube electrode so as to produce a small area on the photosensitive electrode which is scanned by the electron beam during each horizontal scanning line to produce the reference phasing signal. In a practical system embodying this invention, the color difference signal encoding filter is a two component device by which two color difference signals are generated as amplitude modulations of two suppressed color carrier waves of different frequencies which are separated by appropriate filters and supplied to two separate signal processing systems such as that described.

For a more complete disclosure of the invention, reference may be had to the following detailed description of an illustrative embodiment of the novel system and of several illustrative examples of some of the apparatus used in the system, the description being given in conjunction with the accompanying drawings, of which:

FIG. 1 is a block circuit diagram of the signal processing system embodying the invention for the development of two unambiguous color difference signals and a luminance signal;

Figure 3:
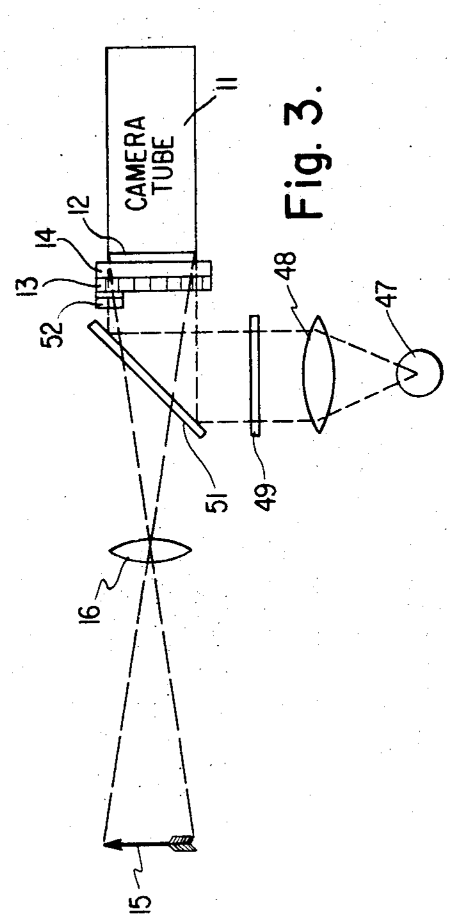
FIG. 3 is a view of the camera tube and the arrangement of the optical apparatus by which to project light both from the subject and from a separate source for the generation of the phasing pulse.

In FIG. 1 a color television camera includes a pickup tube 11, such as a vidicon for example, having an internally formed photosensitive electrode 12 and a spatial color difference signal encoding filter grating 13 located, in an image plane which in this case is in direct contact with the faceplate 14 of the tube so as to optically transmit light from a colored subject 15 which is focused thereon by means comprising an optical system 16. Although forming no part of the present invention, it is to be understood that the filter grating 14 may have other locations, such as internally of the camera tube 11 for example. The general character of the filter grating 14 is similar to those disclosed in the Kell and Macovski Patents previously referred to, but including other features such as shown in later-to-be-described FIG. 4 by which to produce color difference signals (B-Y) and (R-Y), for example. The camera tube 11 has a conventional electrode structure and other apparatus (not shown) by which to form and deflect an electron beam to scan the photosensitive electrode 12 so as to develop in the output of the tube video signals representative of the luminance and color information of the subject 15, together with the phasing pulse feature of the invention.

Figure 4:
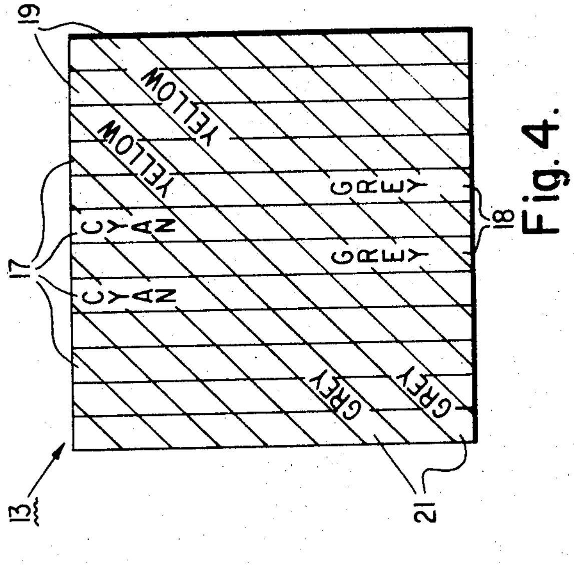
FIG. 4 is a fragmentary portion, to a grossly enlarged scale, of a form of color difference signal encoding filter usable with the invention; and with an external light source for the generation of the phasing pulse.

Before proceeding further with the description of the circuit system of FIG. 1 the color difference signal encoding filter grating 13 will be described with reference to FIG. 4. The filter 13 is generally similar to that disclosed in a copending application of A. Macovski having Ser. No. 517,638, filed Dec. 30, 1965 and entitled "Filter for Encoding Color Difference Signals." In the present FIG. 4 the filter 13 comprises a first grating having a first set of spaced substantially vertical strips 17 of cyan (comprising blue and green) light passing material with which are alternated a second set of strips 18 of neutral grey light passing material. All of the cyan and grey strips 17 and 18 are of substantially equal widths, having equal transmissivity for white light, and constitute a relatively high frequency grating because the strips 17 and 18 are at right angles to the horizontal movement of the electron beam scanning across corresponding areas of the photosensitive camera tube electrode 12. The filter 13 also has a second grating having a first set of spaced strips of yellow (comprising red and green) light passing material, which are disposed at about a 45 degree angle to the first grating of cyan and grey strips 17 and 18, and with which are alternated a second set of strips 21 of neutral grey light passing material. All of the yellow and associated grey strips 19 and 21 are of the same equal widths of the cyan and associated grey strips 17 and 18 have equal transmissivity for white light. The second filter grating of yellow and grey strips 19 and 21 constitutes a relatively low frequency grating because of the oblique angular orientation of this group of strips relative to the first filter grating of cyan and grey strips 17 and 18. The electron beam, in one line scansion, therefore, does not cross as many of the areas of the photosensitive camera tube electrode 12 corresponding to the second grating strips as it does of the electrode areas corresponding to the first grating strips.

In the embodiment of the invention illustratively disclosed herein the numbers of strips of the filter 13 is such that, at the horizontal line scanning repetition rate set by the Federal Communications Commission (FCC) as a standard for use in the United States television systems, the red color difference signals (R-Y) produced in the camera tube output by means including the grating of cyan and grey strips 17 and 18 comprise sidebands of a suppressed carrier wave of 5 Mhz and the blue color difference signals (B-Y) produced in the camera tube output by means including the grating of yellow and grey strips 19 and 21 comprise sidebands of a suppressed carrier wave of 3.5 Mhz. There also is produced in the output of the camera tube 11 a luminance signal Y in a relatively low frequency band of 0 —3 Mhz, for example, resulting from the average light projected onto the photosensitive camera tube electrode 12 from the subject 15.

In FIG. 1 the signal output from the camera tube 11 is impressed upon a low pass filter 22 having a frequency pass band of 0 —3 Mhz, a band pass filter 23 having a frequency pass band of 3 —4 Mhz, and a band pass filter 24 having a pass band of 4.5—5.5 Mhz. The luminance signal Y is derived from the filter 22 and is applied to an output terminal 25. It is assumed that color representative signals of a maximum frequency of 0.5 Mhz are to be produced. The filter 23, therefore, passes both upper and lower 0.5 Mhz sidebands of the 3.5 Mhz suppressed carrier wave modulated by the (B-Y) color difference signal which is processed by apparatus to be described to produce the recovered (B-Y) signal at an output terminal 26. Similarly, the filter 24 passes both upper and lower 0.5 Mhz sidebands of the 5 Mhz suppressed carrier wave modulated by the (R-Y) color difference signal which is processed to produce the recovered (R-Y) signal at an output terminal 27. The processing apparatus for both of the blue and red color difference signals is the same; hence, only the apparatus for processing the blue color difference signal (B-Y) will be described and the corresponding apparatus for processing the red color difference signal (R-Y) will be identified by the same reference characters with a subscript *a*.

The sidebands of the 3.5 Mhz (B-Y) carrier wave derived from the filter 23 are demodulated by an envelope detector 28 but, as previously explained, the demodulated signal has a polarity ambiguity resulting from the lack of information regarding the phase of the wave derived from the filter 23. Blue light from the subject 15 which is encoded by the encoding filter 13 will produce a wave having one phase, and yellow (complementary to blue) light from the subject will produce a wave having the opposite phase. The envelope detector 28 is insensitive to the phase of the wave that it demodulates, so there is no way, without further information, to determine whether the signal of a particular polarity (either positive or negative) derived from the detector 28 represents blue or yellow subject light. Therefore, the color difference signal with such polarity ambiguity which is derived from the envelope detector 28 is impressed upon a phase splitter 29 which produces positive and negative polarity versions of the detected signal respectively at its output terminals 31 and 32. A control switch 33 is operated in response to a correct phase indicating signal, produced in accordance with this invention in a manner presently to be described, to couple the (B-Y) output terminal 26 to the proper one of the positive and negative terminals 31 and 32, respectively, of the phase splitter 29 to produce an unambiguous blue color difference signal (B-Y) at the terminal 26.

In order to control the switch 33, the output of the filter 23 is applied to an amplitude limiter 34, the output from which has little amplitude modulation and is impressed upon a frequency multiplier 35 which, in this embodiment doubles the frequency of the impressed wave. It will be understood, though, that any multiplication of the wave derived from the limiter 34 by an even number of factor is within the purview of this invention. The wave produced in the output of the frequency multiplier 35 will always be of the same phase regardless of any 180° phase shifts of the input wave because of the even harmonic relationship of the output wave to the input wave. The multiplied frequency wave derived from the multiplier 35 is impressed upon a controllable phase frequency divider which, in the case of the illustrated doubling by the multiplier 35, is a binary divider 36. While the output wave of the divider 36 will have a phase ambiguity of 180°, its output wave can be made to have the correct phase by starting the divider in the correct phase at the start of each horizontal line of the raster provided that a color signal of some polarity exists for substantially the entire line. The correct phase starting of the divider 36 at the start of each line of the raster is effected, in accordance with a feature of the invention, by producing a phasing pulse at the start of each horizontal scanning line.

Figure 2:
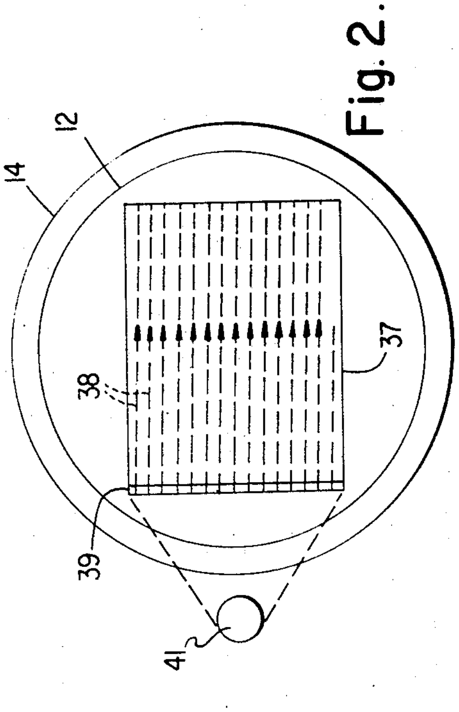
FIG. 2 is a sectional view of the camera tube taken on the line 2–2 of FIG. 1 and showing the location of the phasing pulse generating strip.

In FIG. 2 the photosensitive electrode 12 of the camera tube is shown as seen from the back of the tube with the raster 37 indicated thereon which is scanned from left to right by an electron beam (not shown) in a series of vertically spaced substantially horizontal lines 38. A narrow strip 39 at the extreme left hand edge of the raster 37 serves as a phasing pulse generating means. Suitable illumination of the strip 37 will cause the generation of the desired phasing pulse when the strip is scanned by the electron beam. For example, the phasing strip 39 may be an opaque phosphor which serves to mask out light from the subject 15 and which may be illuminated by an external source of ultraviolet radiation 41 so that, the electron beam scansion of the strip 39 produces the desired phasing pulse.

In FIG. 1 the phasing pulse is included in the output of the filter 23 which, in addition to being supplied to the amplitude limiter 34 as previously described, is applied to the input circuit of a gate 42, the output circuit of which is coupled to a comparison means such as a synchronous detector 43. The gate 42 also has a control circuit coupled to a terminal 44 at which there is supplied a gate operating pulse 45 which may be derived from the usual apparatus (not shown) conventionally included in television camera systems to provide timing pulses such as for deflection drive, camera blanking, signal clamping and the like. The gate operating pulse is timed to coincide with the occurrence of the phasing pulse at the start of each horizontal scanning line so that only the phasing pulse is applied to the synchronous detector 43. This detector also receives the phase ambiguous output of the binary divider 36. Should the output of the divider 36 be out of phase with the phasing pulse the synchronous detector 43 produces a phase correcting signal which is impressed upon the divider 36 to reverse the phase of its output, thereby producing a wave having the proper phase of the blue color difference (B-Y) signal wave.

The (B-Y) signal wave from the filter 23 and the properly phased wave derived from the divider 36 are applied to a synchronous detector 46 to produce an indicating signal which is applied to and operates the control switch 33 to couple the proper one of its positive and negative output terminals 31 and 32, respectively, to the output terminal 26 so that an unambiguous (B-Y) signal is produced thereat.

The relatively simple phasing pulse generating system shown in FIG. 2 i has the disadvantage of the possible loss of proper phasing during a horizontal scanning line when an area of the photosensitive electrode 12 of the camera tube 11 is either devoid of any light or light which has no color as derived from the subject 15. In either case no carrier wave signal is produced for application to the binary frequency divider 36 which causes it to stop. If a carrier wave signal then is produced later in that line scanning interval, the divider will restart but with an arbitrary phase which has as much chance of being wrong as right. Such a problem may be minimized by using a high Q narrow band tuned filter at the output of the frequency doubler 35, thereby maintaining the supply of information to the divider 36 during interruptions of the input information. The Q of such a filter must not be too high, however, in order to avoid another problem of either not allowing the divider to start fast enough at the beginning of the next horizontal scanning line in response to the next phasing pulse or by controlling the divider phase by information effectively "remembered" from the preceding line. Such problems may be avoided by electrically controlling the Q of such a tuned filter circuit by damping it at the end of each scanning line, thereby providing it with a relatively low Q only at the start of each line so that it can respond to the phasing pulse, and then to resume its high Q for the remainder of the line. Such damping can be achieved by connecting a diode across such a high Q tuned circuit and keying or gating the diode into operation by a suitable pulse similar to the pulse 45 but preceding it in time to occur at the end of each scanning line.

The system described may not be entirely adequate, however, when the subject has relatively extensive black areas that extend over most or all of one or more lines of the raster. In order to insure against the improper phasing of the frequency divider 36 of FIG. 1 in any of the instances described, this invention provides for the addition of a small amount of either green or magenta light uniformly supplied to the entire scanned area of the photosensitive electrode 12 of the camera tube 11. One such arrangement is shown in FIG. 3, wherein apparatus components which are the same as some of those of FIG. 1 are identified by the same reference characters. Light from a source of white light 47 is projected through a collimating lens system 48 and a color selective filter 49 onto a partially silvered mirror 51 from which it is reflected through the color difference signal encoding filter 13 to flood the entire scanned area of the photosensitive electrode 12 with a small amount of light of a color determined by the character of the filter 49. Both the added light from the source 47 and light from the subject 15 is passed through a narrow phasing pulse generating strip 52 located between the mirror 51 and the signal encoding filter 13. The phasing strip 52 is made of light selective filter material corresponding to the color of the added light. If the filter 49 passes green light to be added to the subject derived light, the phasing strip is of green light passing material and if the filter 49 passes magenta light, the phasing strip also passes magenta light. The region of the photosensitive electrode 12 corresponding to the phasing strip will thus receive the added light and light from the subject 15 through the color selective phasing strip so that the added light can only add to the desired subject derived information and can never detract from it.

Because either green or magenta light is added to the entire scanned area of the photosensitive electrode 12 the positive or negative output signals at both the (B-Y) and (R-Y) terminals 26 and 27, respectively, will include a constant amplitude pedestal voltage representative of the added light. Such a pedestal voltage can be effectively subtracted from the desired color difference signals by measuring the pedestal voltage produced by the added light during the phasing pulse generating period. This voltage is then subtracted from the signals in both of the blue and red color difference signal processing channels in a conventional manner. In order to make such a measurement, however, light from the subject 15 must be masked out during the phasing pulse generating period. Such masking is not done in the arrangement shown in FIG. 3. One way of making an accurate measurement of the pedestal voltage produced by the added light is to include an additional lens in the optical system for projecting light from the subject onto the camera tube with an appropriately placed mask to prevent light from the subject from reaching that area of the camera tube photosensitive electrode 12 by which the phasing pulse is produced. In such case the amplitude of the phasing pulse derived from the gate 42 of FIG. 1 can be measured to provide a constant pedestal voltage for subtractive combination with the (B-Y) and (R-Y) signals at the respective output terminals 26 and 27. A potential disadvantage of the system of added light described with reference to FIG. 3 is that the light derived from a substantial region of the subject 15 may be of a color which is complementary to the color of the added light, thus producing no carrier wave sidebands and causing the frequency divider 36 of FIG. 1 to stop during a portion of the line scanning period, so that it will have a random phase when it resumes operation. While there are ways of minimizing such a problem, there are no practical ways of completely avoiding such an occurrence in the added light system described.

There is, however, one entirely practical arrangement of the apparatus of FIG. 3 to avoid the problem just referred to and also to obviate the need for canceling pedestal voltages from the color difference signals. The filter 49 is in the form of a grating 49*a* illustrated in FIG. 5. The grating comprises alternating green and magenta light passing strips 53 and 54, respectively, which have equal transmissivity for white light. Also, the widths of the strips 53 and 54 are such that, when the corresponding areas of the photosensitive electrode 12 of the camera tube are scanned by the electron beam, the frequency of the resultant signal is about 0.6 Mhz which is outside of the 0.5 Mhz band of sideband frequencies assumed for the color difference signals (B-Y) and (R-Y). Because of the coarseness of the filter grating 49*a* there is no need to use additional optical apparatus to project its image onto the camera tube 11. This can be effected by the collimating lens system 48 of FIG. 3 provided that the white light source 47 is a relatively small point source. In such an arrangement the color grating 49*a* of FIG. 5, when used in the arrangement of FIG. 3 as described, will not be visible because the green and magenta strips 53 and 54 pass equal and opposite colors which effectively cancel each other, and hence will not result in the production of signals in the color difference signal channels. It is necessary, however, that the band pass apparatus such as the filters 23 and 24 of FIG. 1 have bandwidths sufficient to pass the sideband frequencies created by the mixing or beating of the frequency produced by the color grating 49*a* of FIG. 5 and the color difference carrier wave frequencies produced by the signal encoding filter 13 of FIG. 4. Such bandwidth must be maintained in any other signal processing apparatus of FIG. 1 through which the signals derived from the camera tube 11 pass until they reach the frequency multipliers 35 and 35*a*. After the signals are multiplied as described previously, any signal of reversing phase becomes one of constant phase so that all circuits following the multipliers 35 and 35*a* may be very narrow band in character.

Figure 5:
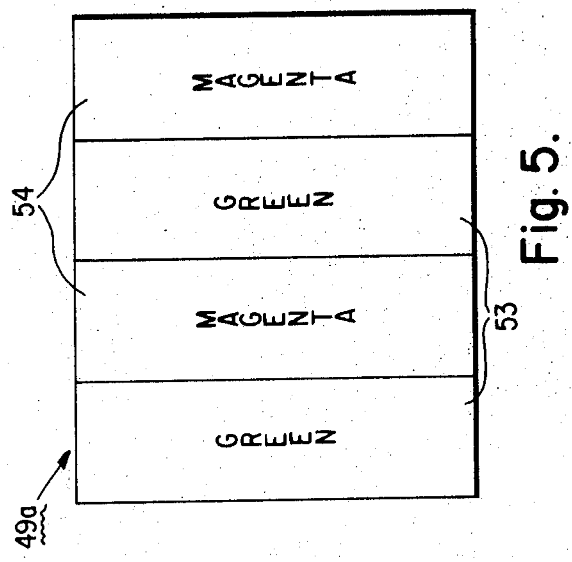
FIG. 5 is a fragmentary portion, to a grossly enlarged scale, of one form of color filter used with an external light source for the generation of the phasing pulse.

In the system of FIG. 3 in which the color grating 49*a* of FIG. 5 is used, the light passing through the first strip of the grating 49*a* and the phasing strip 52 produces the phasing pulse to start the frequency divider of FIG. 1 in the proper phase at the start of each horizontal scanning line. Such an arrangement is virtually assured of accurate operation because the probability that light from the subject will exactly cancel the light from the grating 49*a* for any appreciable portion of a line is essentially nonexistent. Also, because the grating 49*a* effects the projection onto the photosensitive electrode 12 of the camera tube 11 of equal amounts of light of the complementary colors green and magenta, which are mutually canceling, there is no average colored illumination added to the camera tube electrode and, hence, there is no pedestal signal produced in the camera tube output which would require cancellation as in a previously described embodiment of the invention in which the filter 49 of FIG. 3 passes light of a single color.

If for some reason, such as inadequate electrical filtering in the circuit system of FIG. 1 or by the use of color filter strips 53 and 54 in the grating 49*a* of FIG. 5 which produce colors that are incorrect for example, the grating 49*a* tends to be somewhat visible, two spaced point sources of white light may be used in place of the single source 47 of FIG. 3. Such two light sources would be switched into operation during alternate fields of the raster scansion. The horizontal spacing of two such light sources will effectively change the positions of the green and magenta light strip areas on the photosensitive electrode 12 of the camera tube. The spacing of the point light sources should be such that the green and magenta lighted strip areas on the electrode 12 exchange places during alternate scanning fields, thereby canceling any effect of the grating 49*a* in the output signals from the camera tube. Such effective movement of the grating 49*a* may be produced by separating the two point light sources by a distance represented by the expression "*fd* /1, " where "*f*" is the focal length of the collimating lens 48 of FIG. 3, "*d*" width of any one of the green and magenta strips 53 and 54, respectively, of the grating 49*a* of FIG. 5 and "1" is the length of the path from
the grating 49*a* of FIG. 5 and "1" is the length of the path from
the grating 49*a* to the electrode 12 of the camera tube 11 of FIG. 3.

The foregoing description of an illustrative embodiment of the circuit system of the invention and of several apparatus arrangements for developing a phasing pulse at the start of each horizontal line of the raster, which is one of its features, constitutes a disclosure of the novel nature of the invention which is defined in the following claims.

I claim:

1. In a color television system in which light from a colored subject is projected onto the photosensitive electrode of a camera tube through a color difference signal encoding filter and the electrode is scanned by an electron beam in a raster of vertically spaced horizontal lines to produce at least one color difference signal in the form of an amplitude modulated suppressed color carrier wave having a polarity ambiguity because of the suppression of the carrier wave, an unambiguous encoding system, comprising:
detection means responsive to a given frequency band of the sidebands of said color carrier wave for producing positive and negative polarities of said signal modulated color carrier wave envelope constituting said color difference signal;
controllable selection means for selecting either one of said color carrier wave envelope polarities to produce an output color difference signal;
means for generating a phasing pulse at the start of each horizontal scanning line;
wave developing means responsive to said phasing pulse for producing throughout each scanning line an unmodulated constant phase unambiguous reference wave having said color carrier wave frequency;
signal producing means responsive to said signal modulated color carrier wave and to said reference wave for developing an indicating signal representative of the correct phase of said signal modulated color carrier wave; and
means for impressing said indicating signal upon said selection means to so control it that its produced output color difference signal is of unambiguous polarity.

2. In a color television system, an unambiguous encoding system as defined in claim 1, wherein:
said wave developing means includes a frequency multiplier responsive to said color carrier wave for producing an auxiliary wave having said color carrier wave frequency increased by an even number factor; and
a controllable phase frequency divider coupled to the output of said frequency multiplier for producing an unmodulated wave having said color carrier wave frequency.

3. In a color television system, an unambiguous encoding system as defined in claim 2, wherein:
said wave developing means also includes comparison means for comparing said unmodulated wave produced by said frequency divider with said phasing pulse to produce a phase correcting signal representative of an out-of-phase condition of said phasing pulse and said unmodulated frequency divider output wave; and
means for impressing said phase correcting signal upon said frequency divider to reverse the phase of said unmodulated frequency divider output wave so as to bring it into phase with said phasing pulse.

4. In a color television system, an unambiguous encoding system as defined in claim 3, wherein:
said wave developing means further includes a gate having (1) an input circuit coupled to receive said phasing pulse, (2) an output circuit coupled to said comparison means, and (3) a control circuit; and
means for impressing a gate operating pulse upon said control circuit at the start of each horizontal scanning line to transmit said phasing pulse to said comparison means.

5. In a color television system, an unambiguous encoding system as defined in claim 4, wherein:
said wave developing means additionally includes an amplitude limiter coupled to the input of said frequency multiplier to impress a constant amplitude color carrier wave upon said frequency multiplier; and wherein:
said frequency multiplier is a frequency doubler;
said frequency divider is a binary counter; and
said comparison means and said signal producing means are synchronous detectors.

6. In a color television system, an unambiguous encoding system as defined in claim 5, wherein:
said detection means includes an envelope detector responsive to said color difference signal modulated carrier wave to produce a demodulated color difference signal; and
a phase splitter coupled to said envelope detector for developing at respective output terminals positive and negative polarities of said demodulated color difference signal.

7. In a color television system, an unambiguous encoding system as defined in claim 6, wherein:
said selection means comprises a switch operable to effectively connect a color difference signal output terminal to either of the output terminals of said phase splitter; and
means including said indicating signal derived from said comparison means for operating said switch.

8. In a color television system, an unambiguous encoding system as defined in claim 1, wherein: said means for generating a phasing signal at the start of each horizontal scanning line comprises:
a narrow vertical strip in a position at one side of said raster to be scanned at the start of each horizontal scanning line; and
means for illuminating said strip by light independent of light derived from said subject.

9. In a color television system, a phasing signal generating means as defined in claim 8, wherein:
said vertical strip is an opaque phosphor which masks out light from said subject; and
said illuminating means is a source of ultraviolet radiation.

10. In a color television system, an unambiguous encoding system as defined in claim 1, wherein said means for generating a phasing signal at the start of each horizontal scanning line comprises:
means for projecting from a light source a small amount of additive light of at least one color through said color difference signal encoding filter over said photosensitive camera tube electrode; and
a narrow vertical strip of filter material to pass light of said given color located between said subject and said color difference signal encoding filter at one side of said raster to be scanned at the start of each horizontal scanning line.

11. In a color television system, a phasing signal generating means as defined in claim 10, wherein:
said color difference signal encoding filter is of a character to encode blue and red color difference signals on two suppressed carrier waves of respectively different frequencies;
said additive light is green; and
said strip filter material is of a character to pass said additive green light and any green light from said subject.

12. In a color television system, a phasing signal generating means as defined in claim 11, wherein:
said light from said source is white; and
said light projecting means includes a collimating lens and a green light passing filter to uniformly illuminate said photosensitive camera tube electrode with green light.

13. In a color television system, a phasing signal generating means as defined in claim 10, wherein:
said color difference signal encoding filter is of a character to encode blue and red color difference signals on two suppressed carrier waves of respectively different frequencies;
said additive light is magenta; and
said strip filter material is of a character to pass said additive magenta light and any magenta light from said subject.

14. In a color television system, a phasing signal generating means as defined in claim 13, wherein:
said light from said source is white; and
said light projecting means includes a collimating lens and a magenta light passing filter to uniformly illuminate said photosensitive camera tube electrode with magenta light.

15. In a color television system, an unambiguous encoding system as defined in claim 1, wherein said means for generating a phasing signal at the start of each horizontal scanning line comprises:
a point source of white light;
a grating of alternating strips of filter material for passing complementary colors of white light in equal amounts; and
means for projecting light from said point source through said grating onto the photosensitive electrode of said camera tube,
the scansion of said photosensitive camera tube electrode area corresponding to the first one of said alternating grating strips producing said phasing signal.

16. In a color television system, a phasing signal generating system as defined in claims 15, wherein: the width and number of said alternating strips of filter material in said grating is such that the scansion of said photosensitive camera tube electrode produces a suppressed carrier wave of a frequency outside of the given frequency band of said color carrier wave sidebands impressed upon said detection means.

17. In a color e television system, a phasing signal generating means as defined in claim 16, wherein:
said color difference signal encoding filter is of a character to encode blue and red color difference signals on two suppressed carrier waves of respectively different frequencies; and
said alternating strips of filter material in said grating pass green and magenta light respectively.

UNITED STATES PATENT OFFICE
CERTIFICATE OF CORRECTION

Patent No. 3,566,017 Dated February 23, 1971

Inventor(s) Albert Macovski

It is certified that error appears in the above-identified patent and that said Letters Patent are hereby corrected as shown below:

Column 2, line 6, that portion reading "804,885" should read -- 804,485 --.
Column 4, line 70, that portion reading "number of factor" should read -- number factor --.
Column 5, line 47, that portion reading "wave from" should read -- wave derived from --.
Column 8, line 2, delete "the grating 49a of FIG. 5 and "l" is the length of the path from".
Column 10, line 49, delete "e".

Signed and sealed this 20th day of July 1971.

(SEAL)
Attest:

EDWARD M.FLETCHER,JR.
Attesting Officer

WILLIAM E. SCHUYLER, JR.
Commissioner of Patents